(No Model.)
A. H. & J. H. DAVIS.
HARROW AND ROLLER.
No. 397,342. Patented Feb. 5, 1889.
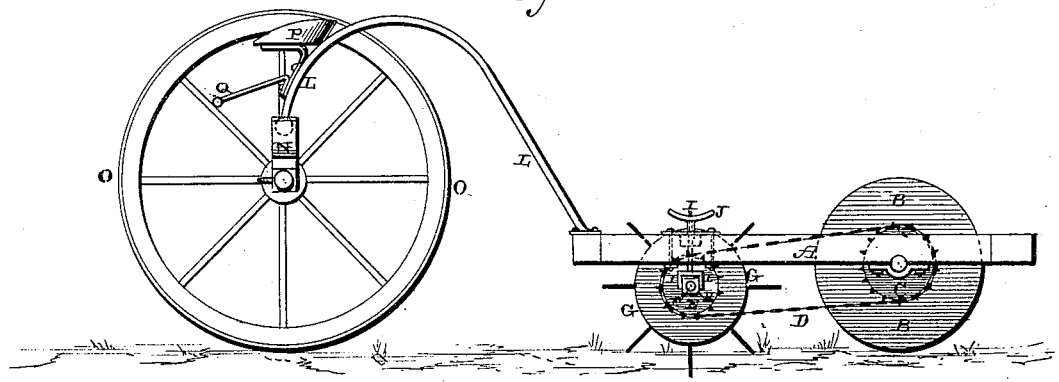
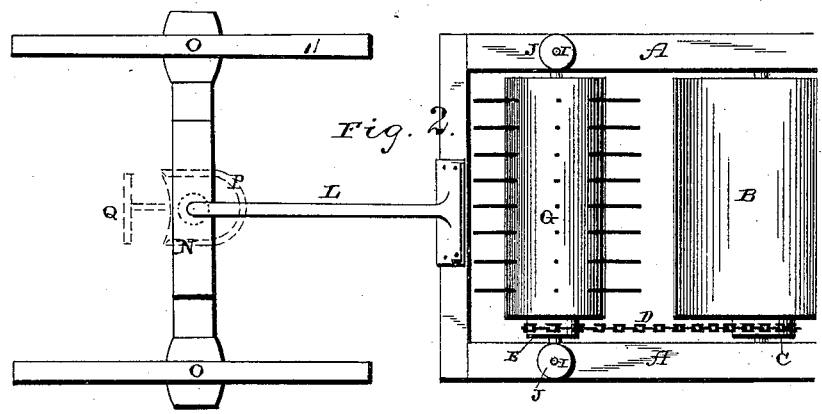

UNITED STATES PATENT OFFICE.

ALBERT H. DAVIS AND JOHN H. DAVIS, OF LOVELAND, COLORADO.

HARROW AND ROLLER.

SPECIFICATION forming part of Letters Patent No. 397,342, dated February 5, 1889.

Application filed May 23, 1888. Serial No. 274,786. (No model.)

*To all whom it may concern:*

Be it known that we, ALBERT H. DAVIS and JOHN H. DAVIS, of Loveland, in the county of Larimer and State of Colorado, have invented certain new and useful Improvements in Combined Harrows and Rollers; and we do hereby declare the following to be a full, clear, and exact description of the invention, such as will enable others skilled in the art to which it pertains to make and use it, reference being had to the accompanying drawings, which form part of this specification.

Our invention relates to an improvement in combined harrows and rollers; and it consists in the combination of a suitable frame, a roller which is journaled therein, a revolving harrow which is operated by a sprocket-chain which passes around suitable sprocket-wheels upon the axles of both the roller and the harrow, and an arched support which is rigidly secured to the frame in which the roller and harrow are journaled, and which has its front end secured to the axle of the driving-wheels by means of a ball-and-socket joint, and which forms, also, a support for the driver's seat, all of which will be more fully described hereinafter.

The object of our invention is to provide a combined harrow and roller in which the harrow and roller frame is connected to an axle mounted upon driving-wheels, and to which the team is secured by means of an arched support which allows the front axle to turn freely in any direction, and which also serves as a support for the driver's seat.

Figure 1 is a side elevation of a machine embodying our invention complete. Fig. 2 is a plan view of the same.

A represents a suitable rectangular frame, in which the roller B is journaled. Upon the axle of this roller B are placed the sprocket-wheels C, from which pass the sprocket-chains D around similar wheels, E, upon the axle F of the revolving harrow or cultivator G. This revolving harrow or cultivator is made circular in shape, and is provided with suitable cutters or teeth of any desired length or shape, and which, as the cultivator and harrow are made to revolve, penetrate the ground and break up the clods in advance of the roller B.
As long as the machine is in motion, the frictional contact of the roller B upon the ground causes it to revolve, and this roller transmits the rotary motion to the harrow or cultivator G. The roller B is journaled in rigid bearings, the boxes of which are secured to the under side of the frame; but the axle F of the harrow or cultivator G is journaled in the boxes H, which are pivoted in the adjustable supports I. These supports I are screw-threaded at their upper ends where they pass through the frame A, and receive the swiveled wheels or nuts J upon them. By means of the wheels or nuts J the boxes H can be raised and lowered at the will of the operator, so as to regulate the depth to which the cutters or teeth shall penetrate the earth. These boxes H are pivoted in their bearings I, so that the ends of the harrow or cultivator G shall be comparatively independent of each other.

When the points of the teeth or cutters strike a stone or other obstruction in the earth, one end of this harrow or cultivator will be raised, and if the axle F passed through rigid bearings the shaft or the frame, or both, would be greatly strained, if the teeth or cutters of the rotary harrow or cultivator did not break. By pivoting the boxes as shown one end can rise or fall without straining the shaft in any manner.

To the front end of the frame F is rigidly secured the arched connecting-rod L, which has its rear end bifurcated, and which has its front end curved downward and formed into a ball, so as to fit into a corresponding socket made in the top of the axle N, upon the ends of which the driving-wheels O are placed. This ball-and-socket joint allows the horses to turn the axle freely in any direction, and thus to guide the frame at the will of the driver. The connecting-rod L being arched upward, the wheels O can be swung around directly under it, and thus the frame made to turn as upon a pivot. It is absolutely necessary that this connecting-rod L should be arched, as shown, and should be connected by a ball-and-socket joint to the axle, or a large amount of space would be necessary to turn the machine around. This arched connecting-rod L also serves as a support for the driver's seat P and the foot-rest Q, thus placing him above the axle N, and where he will not be disturbed by the swinging of the wheels around the front end of the connecting-rod, as might otherwise be the case. As the machine is driven forward over the plowed ground, the cultivator or harrow pulverizes the earth and the roller rolls it.

The wheels or nuts J are here shown as having flanges formed on their lower ends, and these flanges are held in recesses in the top of the frame A by means of suitable plates, rods, or other devices, which catch over the tops of the flanges and prevent the nuts or wheels from having any vertical movement. As the nuts have no vertical movement, the bearings I are raised and lowered through the frame when the nuts are caused to revolve. We do not limit ourselves, however, to this precise manner of swiveling the nuts or wheels, for this may be varied at will without departing from the spirit of our invention. It is only necessary to hold the wheels or nuts so that they will hold the cultivator rigidly when it strikes against a clod, so as to crush it.

Having thus described our invention, we claim—

1. The combination of the frame A, the roller B, journaled therein and provided with sprocket-wheels C, the revolving cultivator G, the axle of which is provided with the sprocket-wheels E, the sprocket-chains D, for transmitting the rotary motion of the roller to the harrow, adjustable boxes in which the harrow or cultivator is journaled, and the arched connecting-rod L, secured to the frame A at its rear end, and connected to the axle N at its front end by means of a ball-and-socket joint, substantially as shown and described.

2. The combination of the frame A and the curved connecting-rod L, having the seat P secured thereto, and having its front end formed into a ball, with the axle N, supported upon the wheels O, and having a socket to receive the ball, whereby the axle can be turned independently of the frame, substantially as set forth.

In testimony whereof we affix our signatures in presence of two witnesses.

ALBERT H. DAVIS.
JOHN H. DAVIS.

Witnesses:
CHAUNCEY P. SMITH,
MARY C. DAVIS.